United States Patent [19]

Nutting et al.

[11] E Re. 31,441

[45] Reissued Nov. 15, 1983

[54] PLAYER OPERATED GAME APPARATUS

[75] Inventors: David J. Nutting; Jeffrey E. Frederiksen, both of Milwaukee, Wis.

[73] Assignee: Bally Manufacturing Corporation, Chicago, Ill.

[21] Appl. No.: 936,784

[22] Filed: Aug. 25, 1978

Related U.S. Patent Documents

Reissue of:

[64] Patent No.: 4,093,232
Issued: Jun. 6, 1978
Appl. No.: 576,980
Filed: May 13, 1975

[51] Int. Cl.[3] ..... A63F 7/00
[52] U.S. Cl. ..... 273/121 A
[58] Field of Search ..... 273/1 E, 1 GC, 54 C, 273/85 G, 118 A, 119 A, 121 A, 122 A, 125 A, 126 A, DIG. 28, 143 R, 143 C; 235/1 B, 1 GA, 156; 179/15 AL; 364/410-412; 445/1; 340/323 R; 377/5

[56] References Cited

U.S. PATENT DOCUMENTS

| | | | |
|---|---|---|---|
| 2,479,707 | 8/1949 | Durant | 273/121 A |
| 2,806,701 | 9/1957 | Durant | 273/125 A |
| 2,864,619 | 12/1958 | Burnside | 273/121 A |
| 3,703,288 | 11/1972 | Vogel et al. | 273/126 A |
| 3,715,746 | 2/1973 | Hatano | 340/365 S |
| 3,809,395 | 5/1974 | Allison et al. | 273/1 E |
| 3,874,669 | 4/1975 | Ariano et al. | 273/85 G |
| 3,889,956 | 6/1975 | Castle | 273/1 E X |
| 3,907,290 | 9/1975 | Fischer et al. | 273/54 C |
| 4,008,893 | 2/1977 | Yoseloff | 273/85 G |
| 4,026,555 | 5/1977 | Kirschner et al. | 273/85 G |
| 4,087,855 | 5/1978 | Bennett et al. | 364/200 |

FOREIGN PATENT DOCUMENTS 2038597 12/1970 France .

OTHER PUBLICATIONS

*Bally Alley Service Manual;* Bally Manufacturing Corp.; Jan. 1978.
*Popular Electronics;* "Altair 8800;" Jan. 1975; pp. 33-38.
*Popular Science;* "Games Computers Play"; Oct. 1970; p. 44.
*EE/Systems Engineering Today*; "Electronic Plays the Pins"; Nov. 1973; pp. 27-31.
*The Semiconductor Data Library*; Motorola, Inc.; 1973; pp. 2-53.
*General Electric Transistor Manual*; 1964; pp. 29, 30.
*Intel Intellec 4 and Micro Computer Modules Reference Manual*; 1974; pp. 15-17, 39, 40.
*The Optoelectronics Data Book for Design Engineers*; 1970-1971; pp. 212-228.
*MCS-4 Microcomputer Set Users Manual*; 1974; pp. 1-6, 51-54.
*Electronic Design*; Apr. 12, 1973; pp. 84-89.
*Process Instruments and Controls Handbook*; 1975; pp. 8/34-8/47.
*Electronics*; Oct. 25, 1973; pp. 71-106.
Motorola Monitor; Dec. 1973; pp. 5-11.
Electronics; Mar. 21, 1974; pp. 19-20.
Litronix Appnote 3; 1971; pp. 1-4.
*Electronics*; Mar. 1, 1973; pp. 63-64.
"Programmable Logic Controllers-Painless Programming to Replace the Relay Bank"; Apr. 1971; pp. 49-60.
*Application Notes Parallel Processing System*; 1972; pp. 1-25.
"The Potential Impact of Microprocessor Technology"; Dec. 1974; pp. 1-33.
"Minicomputers & Microcomputers The Squeeze Is On"; 1974; pp. 79-82, 85-88, 113-114; 140-152, 211-218.
*Electronics;* Jun. 27, 1974; pp. 69-70.
*Electronics;* Jul. 11, 1974; pp. 92-95.
*Fairchild TTL Applications Handbook*; Aug. 1973; pp. 1/5, 1/6, 3/1-3/24, 15/3-15/4.
*Application Notes*; "Mos/LSI Timer-Controller Sequencer TCS Device"; Apr. 1972; pp. 1-12.
*Application Notes;* "Programming Manual for Timer Controller Sequencer"; Mar. 1972; pp. 1-15.
*Application Notes;* "Timer-Controller Sequencer (TCS) Device Evaluation Unit;" Dec. 1972; pp. 1-6.

*Primary Examiner*—Vance Y. Hum
*Attorney, Agent, or Firm*—Welsh & Katz

[57] ABSTRACT

A pinball game has a playing field with ball directing lanes and targets and flipper elements for returning the ball. A programmed logic array is connected to the switches, response lamps, digit scoring lamps, and audible devices. A matrix circuit is connected to the switches and places information into a memory, the output of which is connected through to activate lamps and audible devices which produce a continuous output if energized. A scanning decoder coupled to the matrix circuit is driven from the programmed logic array.

95 Claims, 5 Drawing Figures

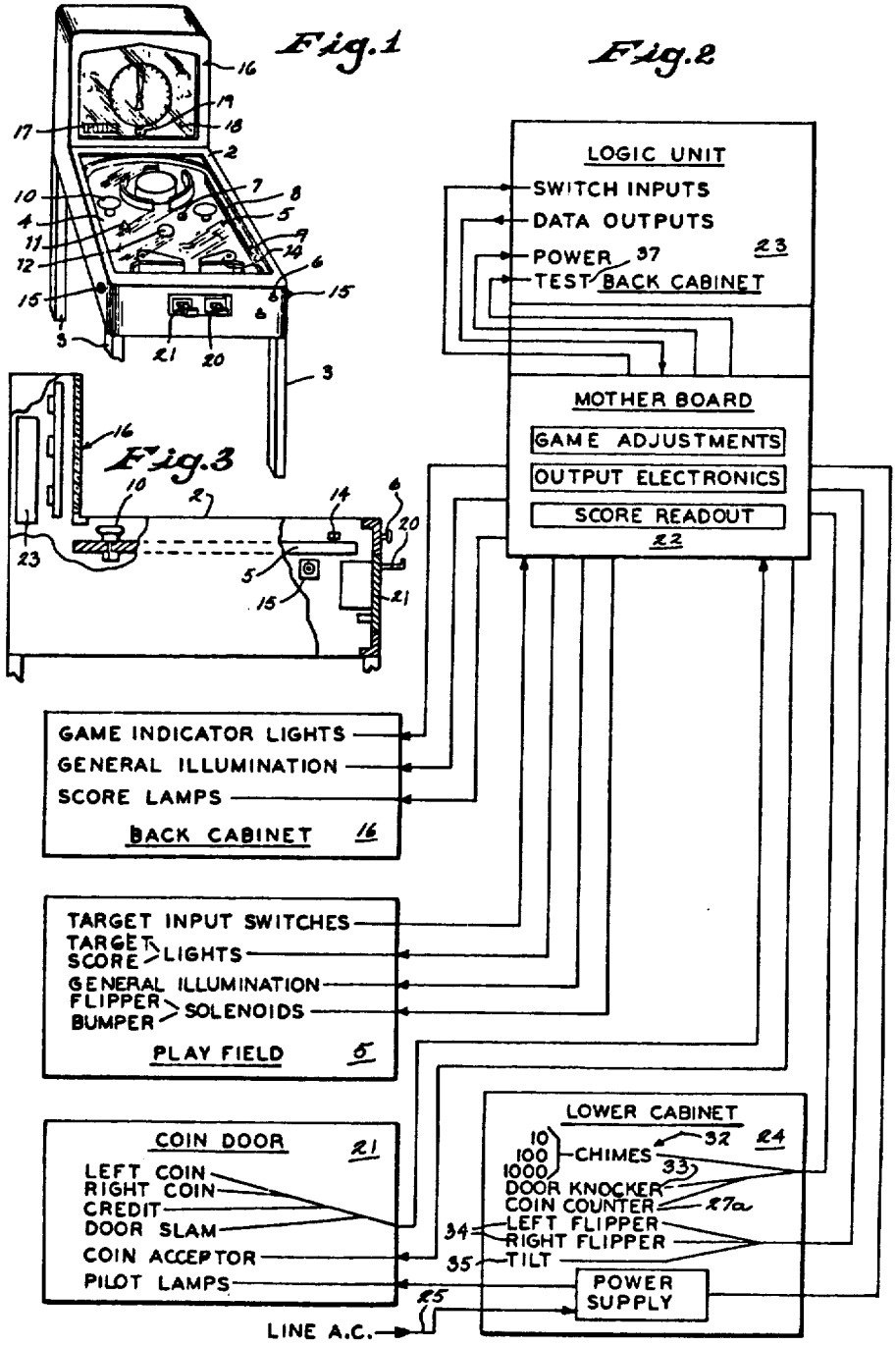
Fig.1
Fig.2
Fig.3
LOGIC UNIT
SWITCH INPUTS
DATA OUTPUTS
POWER
TEST
37
BACK CABINET
23
MOTHER BOARD
GAME ADJUSTMENTS
OUTPUT ELECTRONICS
SCORE READOUT
22
GAME INDICATOR LIGHTS
GENERAL ILLUMINATION
SCORE LAMPS
BACK CABINET 16
TARGET INPUT SWITCHES
TARGET
SCORE
LIGHTS
GENERAL ILLUMINATION
FLIPPER
BUMPER
SOLENOIDS
PLAY FIELD 5
COIN DOOR 21
LEFT COIN
RIGHT COIN
CREDIT
DOOR SLAM
COIN ACCEPTOR
PILOT LAMPS
LOWER CABINET
10
100
1000
CHIMES
32
24
33
DOOR KNOCKER
COIN COUNTER
27a
34
LEFT FLIPPER
RIGHT FLIPPER
35
TILT
POWER SUPPLY
25
LINE A.C.

PLAYER OPERATED GAME APPARATUS

Matter enclosed in heavy brackets [ ] appears in the original patent but forms no part of this reissue specification; matter printed in italics indicates the additions made by reissue.

BACKGROUND OF THE INVENTION

This invention relates to player operated game apparatus and particularly to a game apparatus employing multiple display means actuated in response to player manipulated and controlled movement of elements and particularly to a pinball game apparatus and the like.

Pinball type game apparatus is widely employed in various recreational establishments. Uniformly, such games employ the ejection of a playing ball to the upper end of a downwardly inclined playing field. The ball moves down under gravity forces through a maze of alleys or lane forming elements, target bumper elements of various forms and the like. The movement through the lanes and into engagement with several bumpers, lane switches and the like complete suitable circuits to activate suitable display and scoring mechanisms. The operator can partially control the movement of the ball by limited jarring of the playing field and generally through the activation of manually operated flipper control means which operate one or more dispersed pivotally mounted flipper arms on the upper surface of the playing field. Such games are widely available in many different formats and arrangements. They almost universally, however, employ a structure with an upright back panel on which game indicating lights, digit scoring and the like are displayed along with general pictoral information with suitable illumination. Audible devices such as bells or chimes are also normally incorporated to respond to selected targets within the playing field. In addition, scoring openings in the playing field have switches to indicate receipt of a ball and automatic rejecting means to propel the ball back onto the playing field. Such devices are generally coin-operated and may provide for multiple operation whereby two or more players can sequentially play the game, with individual indication of the player, as well as individual scoring and the like for limited competitive purposes. In such games various controls must of course be provided to control the response of the system as well as providing interlocking controls for example in response to insertion of proper coins and the like to activate the system including the flipper controls. Further the game will normally include an automatic tilt whereby an unacceptable jarring of the playing field results in a termination of the game.

Such apparatus with the several elements as described have been constructed for many years employing hard wiring of the game system through an electromechanical control. Thus the various target input switches are connected directly to selectively control the target lights. Similarly, the flippers may be provided with release devices responsive to the proper introduction of coins to actuate an electrical interlock. Although such systems have been widely employed, they have been relatively expensive not only in initial cost but in subsequent maintenance. Further, any single construction is essentially related to a single game plan and thus for providing a great variety of games, significant individual design requirements exist. Further, if a game once designed and marketed is not readily accepted, it cannot be readily and conveniently changed to overcome any of the assumed undesirable features. Such games are, of course, in such demand, however, that they are widely manufactured and sold even with present marketing restrictions and constraints. There is, however, a need for a method of simplifying the game design and apparatus which will permit the manufacturer to adapt to rapidly changing market conditions and requirements. Of course, the game apparatus should provide economy in construction as well as in maintenance and operating costs.

SUMMARY OF THE PRESENT INVENTION

The present invention is particularly directed to such game apparatus wherein movement of an element is selectively and partially controlled with respect to element activated response devices, which in turn are connected in an isolated connection to activate automatic display means such as visual and/or audio means and the like wherein both stimulatory and numerical scoring display are provided. As the present invention is uniquely applied to and develops a unique pinball game apparatus, the invention is described in connection therewith for purposes of reference. Generally, in accordance with the present invention, the display means, the element activated response means, and the interlocking control means are arranged into sequentially activated element groups and connected through a matrixing or multiplexing means to a programmed logic means such as a microprocessor to provide a highly improved control and response of the game apparatus. The multiplexing means sequentially couples the activated elements in the system at a sufficiently rapid repetitive rate to effectively present a continuous monitoring and presentation of the several display means, producing interconnection of the response means and operation of the interlocking control means to properly monitor, score, and display during each cycle of the program. The processing system permits significant cost reduction in the initial construction as well as convenient changes in the basic approach of any given structure. Generally, in accordance with the present invention, the playing field is constructed in accordance with the usual construction to develop a plurality of lanes, response target devices and flipper elements. The several elements activate switch means and establish signals to a common matrixing or multiplexing circuit. A programmed logic array means rapidly and in cyclical manner scans the input lines coupled to the switch means and detects the device operation and subsequently correspondingly activates within each cycle the proper visual output of display means which include the conventional visual display lamp means, audible means or visual display means as well as a digit display. In accordance with a particular aspect of this invention the digit display is developed through a suitable line segment generator. The switch means are thus connected to place the switch information into a memory system, the output of which is connected through the same matrix board to activate the desired visual and audible devices including visual display lamps, scoring digit display means as well as audible devices. The switch means further include interlocking monitoring means to determine the status of the apparatus with respect to, for example, the tilt condition, the receipt of an appropriate input such as coins, credit condition, automatic additional game incentive in response to previous games scoring and the like during each cycle and operable to provide a priority type control to the program logic array. This information is also fed through the matrix board into the memory unit, the output of which is selectively connected to the same matrix board. The output from the multiplexing or matrix board is further interconnected to the lamps and to the control solenoid to release the apparatus for play to thereby provide complete interlocking control through the memory and the matrix unit. The programmed logic array is a sequential logic microprocessor with the input lines of the matrix board sequentially scanned on a repetitive basis with the information transmitted to the interlocks and to the display means to activate the device or the game apparatus in accordance with the inputs and the memory. The repetition rate or frequency is sufficiently rapid to maintain the presentation and activation of the output means as if a direct pass through of the information from the switches to the output and control devices was established.

The invention thus provides a convenient means for maintaining a generalized logical control for a game apparatus employing the advantages of a small memory system which can, of course, be readily adapted to a conventional software control of the game response in accordance with a relatively fixed field memory.

More particularly, in a particular unique implementation a small microprocessor is suitably housed in the back housing wall or box of a pinball unit and coupled through a sixteen slot matrix board to a read only memory for activating of the display means and sensing of the various switch conditions in combination with a continuous test and interlock system to maintain interlocking control of the system while play is in operation and storing of the condition with respect to subsequent play of the apparatus. More particularly, in accordance with a particular constructional novel feature and embodiof the present invention, a multiplexing circuit is driven from a random access memory to sequentially activate a plurality of multiplex input lines on a continuous cyclic basis and a similar parallel decoder is preferably coupled to condition a main driving power output as connected to operate the several playing components.

Processing will further normally include a step command signal to simultaneously activate the multiplexing decoder or sequencing system and simultaneously control the interfacing drive to the display means to maintain precise synchronous relationship. This is particularly significant to permit the use of relatively minimal number of driver transistors or the like. The multiplexing output lines are coupled to provide information to the random access memory and to drive the several lamps, interlocks and control means. The lamp circuits include suitable low beta driver transistors in series with low voltage lamps, with a driving voltage significantly greater than the rated voltage. The circuits are completed once each programmed cycle and produce momentary high current lamp energization. However, the average current is normal and the lamps will operate without adverse effect and at a significant economy. Further, the transistors of limited capacity produce inherent current limiting on cold lamp start to further increase lamp life and are less expensive than higher capacity transistors. They, therefore, provide an inexpensive switch which can be readily and satisfactorily applied in the game apparatus to again provide maximum economy. The input or response switch connection to the programmed logic array for storage of the actuation thereof is also uniquely provided in another feature or aspect of the best embodiments to produce noise immunity. Thus, the switches are connected to ground the inputs through the transistor switch means. The turn-on time of the transistor inserts a time lag in the circuit to the input switches, whch are coupled to the same scan line of the matrix circuit, and effectively makes the response immune to "noise" or transients created in the switching.

Generally, in a highly practical construction a four input port responds to the several playing field inputs to record the play while a four output port provides means for driving of the lamps and selected auxiliary equipment. A further output port provides a drive means to the scoring boards and other auxiliary equipment. In addition, a separate test input line is connected into the circuit through the multiplexing lines to maintain a continuous monitor and an interlock of the system for subsequent play. Thus, the credit condition, as a result of coins, is maintained and provided to sense the activation of such switches. The test output is connected to the computer interrupt and operates the interrupt when a corresponding multiplex line is actuated to provide for the automatic recording of such information. For example, it is, of course, essential that any coin introduced by any player be automatically recorded and credited. The test line will respond to such a condition to momentarily interrupt the usual sequencing and automatically maintain a continuous record of the credit conditions. Similarly, a tilt condition will take precedence and provide automatic processing of the tilt condition.

The multiplexing system develops the same input-output ports providing various functions on a timed division multiplexing control. The scanning rate will generally be held to a minimum of 50 or 60 cycles per second which is above the minimum flicker rate of a conventional display means and insures a continuous display presentation with the scanning concept.

In accordance with a further aspect and novel embodiment of this invention, the interfacing between the switches and non-lamp outputs without suitable thermal inertia includes suitable opto-isolator devices or the like which inherently introduce an automatic memory or storage function to permit the continuous scanning or cycle control concept as applied to the game apparatus.

Thus, generally Applicant has found that the present invention provides a highly improved game apparatus having means to permit significant simplification in the initial cost and particularly pinball-type game apparatus and the like with the production cost and maintenance of the apparatus minimized and further readily adapts to practical commercial implementation.

BRIEF DESCRIPTION OF THE DRAWINGS

The drawings furnished herewith illustrate a preferred construction of the present invention in which the above advantages and features are clearly illustrated as well as others which will be readily understood from the following description.

In the drawings:

FIG. 1 is a pictorial view of a typical pinball machine apparatus;

FIG. 2 is a block diagram showing the various portions of the game apparatus in block diagram with line interconnection between the several components;

FIG. 3 is a side view diagrammatically illustrating the component mounting and housing construction;

DESCRIPTION OF THE ILLUSTRATED EMBODIMENT

Figure 4:
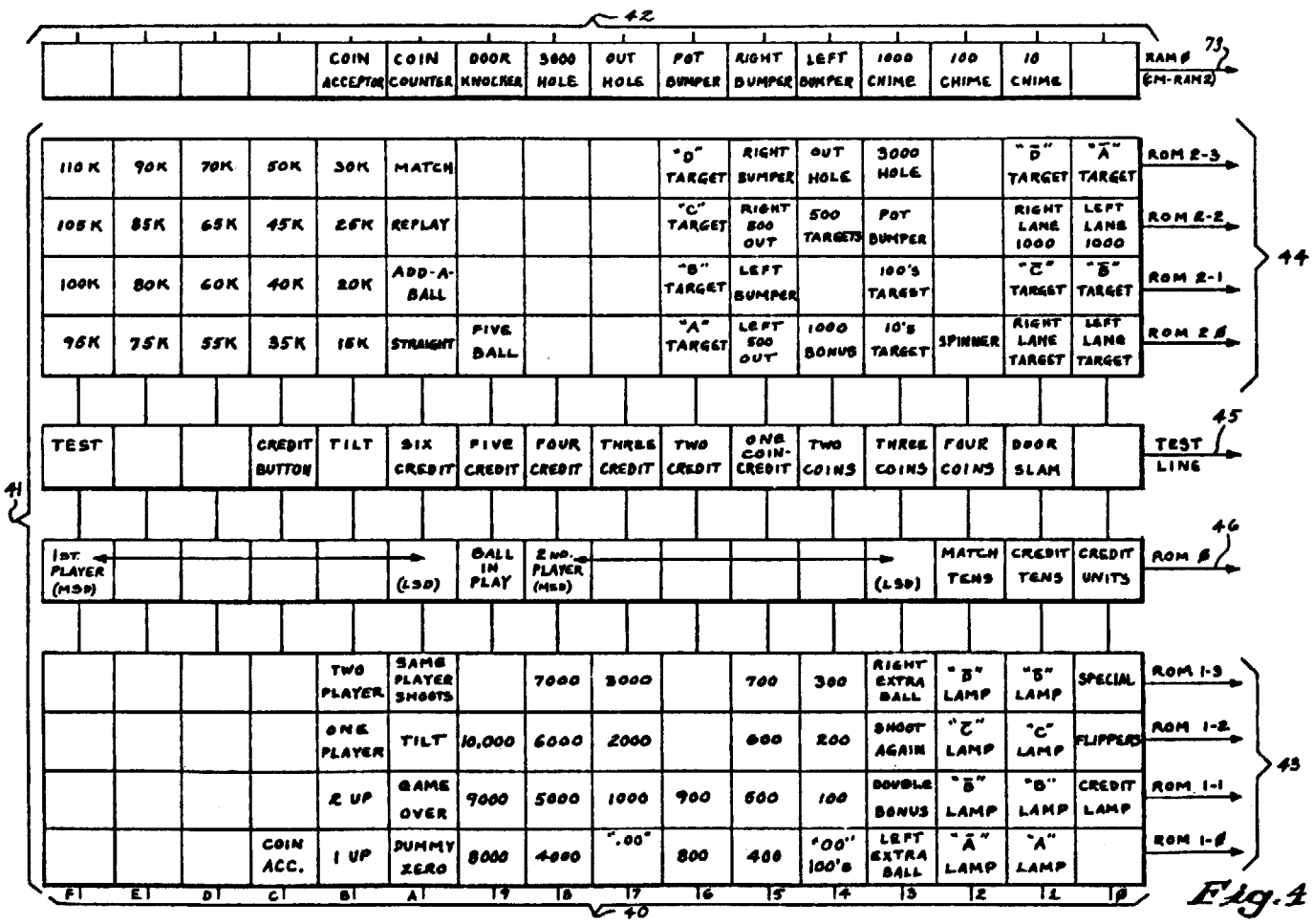
FIG. 4 is a diagrammatic illustration of multiplexing arrangement for a particular pinball game unit as shown in FIGS. 1-3.

Referring to the drawings and particularly to FIG. 1, the present invention is illustrated applied to a typical pinball game machine 1 including an upper game field cabinet 2 supported by a plurality of legs 3 which locate the cabinet 2 approximately at waist height of the usual game player. The cabinet 2 includes a glass top 4 beneath which a playing field 5 is located. A manual ball feeding mechanism 6 is shown to the front for ejecting of a round ball 7 to the upper end of the playing field 5 from which it rolls downwardly under gravity forces across the playing field. In accordance with the usual constructions, the playing field 5 includes left and right lane walls 8 adjacent the outer edges of the field 2, with suitable switch lever means 9, right and left bumpers 10, as well as targets 11 and scoring opening 12 with lever means, all located within the playing field 2. The bumpers 10 and openings 12 operate to propel the ball with a rapid movement depending upon the direction from which the bumper engaged the members and establish various scores when engaged. Further, when the elements are engaged by the ball 7 to provide additional scoring, various lights and audible display means are energized to indicate the response element. For example, a target or a lane lamp may be activated as the ball engages a corresponding portion of the playing field. In accordance with more conventional construction, the apparatus also includes manually operated or controlled flippers 14 pivotally mounted to the bottom portion of the playing field. The flippers 14 pivot for engaging the ball 7 and returning it upwardly on the playing field 5. The flipper controls are conventionally in the form of right and left buttons 15 provided on the corresponding side walls of the cabinet 2 for manual operation by the operator.

Further, in accordance with conventional construction, the apparatus shown in FIG. 1 includes an upstanding back cabinet 16 which is normally glass covered and provided with a suitable decorative material thereon. Player indicating means 17 provides visual presentation of whether player #1 or player #2 should be playing as a result of the operation of the machine, a player related total score area 18 for providing a continuous updated score in digital display for the respective players. A special tilt notice 19 will normally be provided and illuminated if the cabinet is unduly lifted jarred or the like. Various other illuminating lamps to indicate a particular score being added to the total score as a result of a target engagement and the like may also be provided. Obviously, the game apparatus may vary widely with respect to the particulars of the presentation in accordance with the movement of the ball down through the field and into engagement with the various response devices, but all units basically require switch input means, lamp means and digital or number scoring means which are interconnected to produce a visual display and scoring of the play.

A typical system is diagrammatically illustrated in a matrix form in FIG. 4 for purposes of fully describing a preferred embodiment of the present invention.

In addition, a coin receiving means is provided to limit playing of the game to the introduction of coins. In the illustrated embodiment of the invention, a pair of redundant coin acceptors 20 are provided, to minimize service requirements. Introduction of the coins into either coin acceptor 20 will condition the apparatus for the first and second players with the response providing for automatic and alternate play and scoring for the two players. Access to a coin box, not shown, is provided by a locked front door unit 21. The embodiment shown is thus generally typical of the conventional pinball game apparatus. The present invention is particularly directed to the mounting and interconnection of such input switch means, the lamp means, the digit scoring display means and interlocking controls through a special connecting board 22 to a programmed logic array means 23, as diagrammatically shown in FIGS. 2 and 3. The logic array means 23 and board 22 are constructed as a small compact assembly which is readily mounted within the back cabinet 16. The location of these elements provides extremely convenient construction and subsequent servicing of the interconnection to the several components of the playing field 5, on the coin door 21 and elements located within the lower play field cabinet 2 and identified in FIG. 2 as the lower cabinet by block diagram 24. The various components and logic array means for controlling the apparatus are coupled through a motherboard and the coin door for main control thereof. The board further provides interconnection to drive the display of the back panel and simultaneously to activate the panel to receive signals from the playing field switch means and to provide control to the several components of the playing field.

Figure 5:
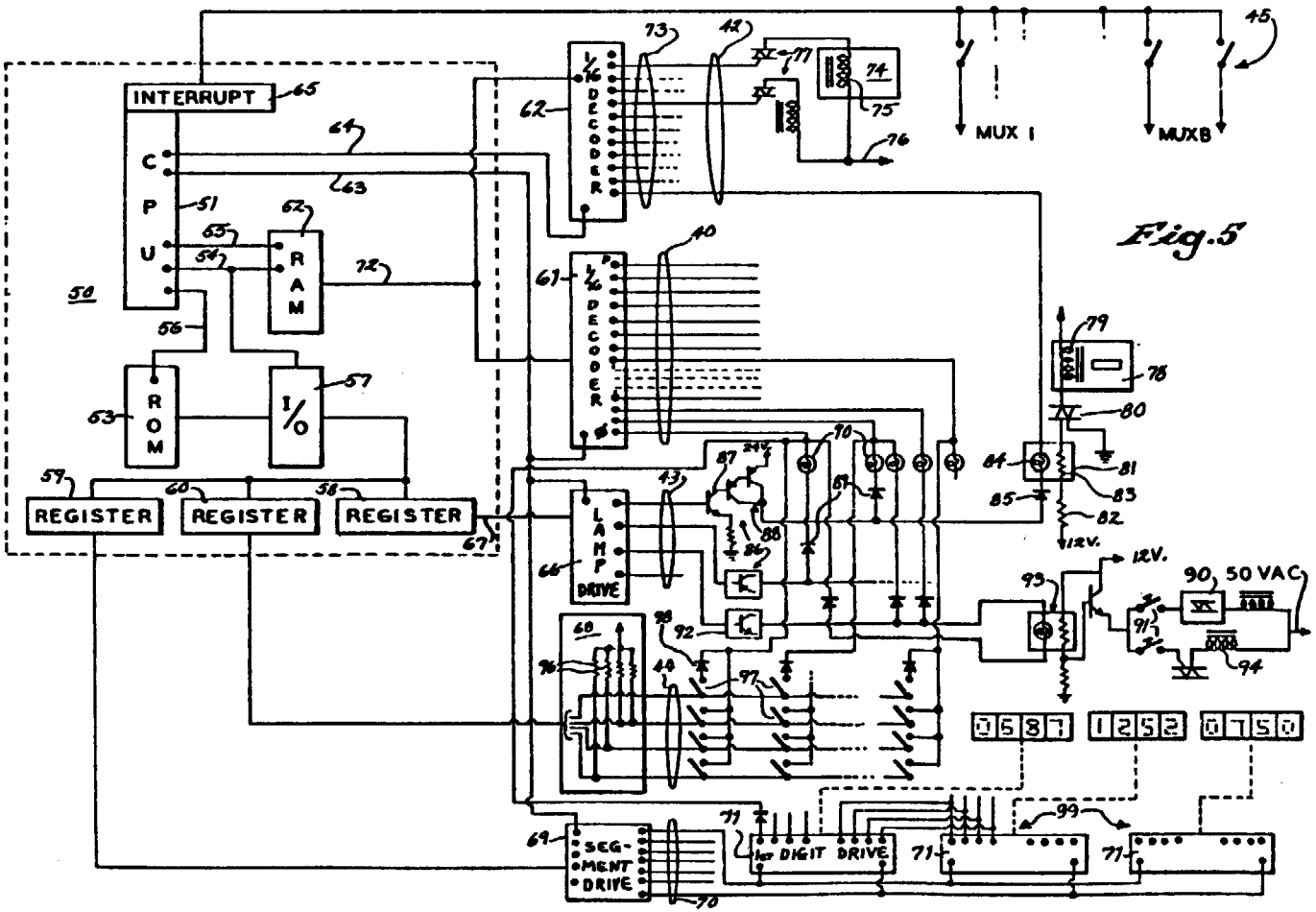
FIG. 5 is a circuit diagram illustrating a typical known computer system interfaced with the game circuit, portions of which are schematically shown to clearly illustrate the present invention.

Thus, FIG. 2 is a general layout of the apparatus in accordance with a teaching of the present invention to more clearly illustrate and describe a preferred system shown in FIGS. 4 and 5, and FIG. 3 illustrates the structural mounting of the components.

Generally a main power supply connection from a main AC power supply line 25 such as conventionally employed in utility distribution systems in the United States provides main power to the system through the lower cabinet 2. The output power is applied directly to pilot lights at the coin input units 20 to indicate the apparatus is in operating condition and simultaneously providing power through the mother board 22 to the several operating components. An interlock acceptor is provided to control the coin units 20 and to permit the introduction of coins only if the apparatus is in proper condition for play. If such signal is received, the apparatus will allow the introduction of coins through either the left or the right coin receivers 20 and provide automatic actuating of a coin counter 27a within the lower cabinet 2 which transmits such information. This information is automatically transferred into a memory means forming a part of the programmed logic array unit 23 within the back cabinet 16 and which then activates the play field 5 and associated components to permit operation of the game if all other conditions are proper. The field 5 includes a general illumination means for the playing field as well as the target score lights which are operated when the target 11 is engaged. The flippers 14 and the bumpers 10 have interlocking solenoids secured to the underside of the playing field 5 and only activated during game play. The input or response switches of the play field 5 are connected to board 22 for signaling of the computer means 23, the back panel 16 receives appropriate general illumination at the start of the game to illuminate the back board which may of course change during the play if desired. In addition, an individual signal is transmitted to the game and player indicators 17 and to the score indicator 18.

The lower cabinet 2 within which the playing field 5 is housed will additionally be provided with certain auxiliary equipment such as individual audible devices such as chimes 32 to respond to certain target engagements and operable to provide an audible as well as a visual signal. The cabinet 2 further includes the coin switch 27a to sense the coins as received and transmit the signal to the computer in accordance therewith. The coin door may incorporate a switch means 33 responding to knocking of door 21 in an attempt to artificially actuate the coin switch. Flipper switches 34 which are coupled to buttons 15 indicate the operation of the right and left flipper and are coupled through the lower cabinet to board 22. Similarly, a tilt response mechanism 35 such as a rolling contact ball, a pendant, switch arm or the like is provided in the lower cabinet to activate the apparatus and terminate operation of the game if excessive tilting or jarring of the cabinet 2 occurs such as would normally be considered undesirable and indicate abnormal rough usage.

The present invention is particularly directed to the concept of employing a simple programmed logic and memory device 23 in combination with a multiplexing board 22 to provide a unique simplified and reliable logic control of the response to the playing field of the game apparatus. The device 23 essentially has a data input port connected to a switch input means for receiving the signals from the several switch means, a second input port to receive a monitor or test line 37 which continuously monitors significant conditions such as the tilt response means 35 and the operation of the coin units 20. In addition, a plurality of output ports are connected to transmit control and operating data from the computer memory and processing means to board 22 for transmission to the various elements of units 5, 16, 21, and 24.

The system is particularly described in connection with a preferred embodiment such as shown in FIGS. 4 and 5. Generally, in accordance with the present invention, the interfacing board 22 employs a time scanned multiplexing connection to directly and separately interface the input from the playing field 5 and the input to the back panel and to the playing field to isolate the contacts from the inputs which inherently include "noise" signals and thereby provides a reliable control system to respond to the movement and action of the playing ball 7 and associated elements. Referring particularly to FIG. 4, a time division multiplexing system is diagrammatically shown including sixteen multiplexing drive lines 40 coupled to and driven from the logic array device 23 for the sequential stepped operation of the multiplexing circuit on a repetitive sequential and cyclical basis. The sixteen drive lines 40 may be identified conventionally for example in a hexidecimal system by the identifying digits zero through nine and identifying letters A through F. Each of the lines 40 are connected in a matrix to a plurality of input-output ports 41 connected to the several input switches, lamps and controls of the playing apparatus as shown in labeled block diagram in FIG. 4. A separate output unit 42 is activated during each cycle of the logic unit 23 to control and energize a plurality of individually powered elements such as the chimes 32, the bumper solenoids 30, ball-hole reject solenoids and the like which require continuous, non-multiplexed activation, as noted in the labeled blocks. In the embodiment of FIG. 5 the output bank or unit 42 includes 16 possible outputs and thus is conveniently shown in FIG. 4 with the matrix or multiplexing unit 41.

In FIG. 4, the several elements of the matrix system or unit 41 have been shown in labeled blocks and grouped generally in accordance with the port connections for interfacing with the programmed logic unit 23. Thus, the several indicating lamps and solenoid controls are grouped and connected to a first set of output ports 43 connected in circuit through similar port configuration. A separate output unit 42 is activated during each cycle of the logic unit 23 to control and energize a plurality of individually powered unit elements such as the chimes 32, the bumper solenoids 30, ball-hole reject solenoids and the like which require continuous, non-multiplexed activitation, as noted in the labeled blocks. A set of input ports 44 are connected to the switch means of play field 5 as well as certain feedback signals for updating the memory unit during any given game or interrelated series of games. A test line port 45 is coupled to continuously monitor the state of the identified selected switch means and provide a direct input to the computer means to interrupt and transfer vital information at any point in the game process. Thus, if a coin is introduced into the unit, credit must be given therefor. If the game apparatus is tilted, the condition must be monitored and the signal essentially immediately transmitted to terminate game play directly to computer means. The test line port 45 provides the means for continuously sensing certain selected priority switches and providing interrupt at any time in each scan cycle to immediately process and properly update the machine memory for appropriate play of the game. A final port 46 is connected to drive the scoring display means for the respective players as well as to indicate to the control any additional games established in the credit system.

In the system the multiplexing lines 40 are sequentially activated from the MUX line $\phi$ and through the MUX line F and at each activation, the several ports 43–46 are thus activated to appropriately drive the several indicating lamps or other elements and to transmit game condition information to the computing means for processing in the conventional manner.

As more fully shown in FIG. 5, the interfacing between the multiplexing circuit means of FIG. 4 and the logic array or means 23 permits the use of any desired sequential logic microprocessor which has suitable read only memory chips for operating of the elements and a suitable random access memory for appropriately processing the information received, and activating the multiplexing lines 40 and the separate driver or output unit 42.

Thus, as shown in FIG. 4 and more fully shown in FIG. 5, the apparatus is adapted to be driven from any suitable sequential logic unit and is preferably a microprocessor including a read only memory which is preset to operate the various elements in accordance with the actuation of the response means and a random access memory interconnected by a processing unit to process the game information.

In the illustrated embodiment of the invention, the sequential logic unit is shown in block diagram as a suitable microprocessor 50 such as that manufactured and sold by the Intel Corporation of Santa Barbara, California and particularly identified in their "Intel MCS-40 User's Manual For Logic Designers" and identified by their number MCS-335A-175/15K, which was published and copyrighted 1974. Generally, as more fully disclosed in the Intel bulletin, the microprocessor 50 includes a central processing unit 51 coupled to a random access memory unit 52 and to a read only memory unit 53 via an I/O cable 54. The memory units 52 and 53 are activated from control lines 55 and 56 from unit 51 to produce a predetermined programmed sequence proceeding through the various functions required to control and play the game apparatus with appropriate subroutines for selected portions such as those responsive to an interrupt input. In the actual construction, the read-only memory 53 is formed on individual chips each of which also includes individual input-output ports for interfacing of the microprocessor with the game apparatus. An I/O circuit 57 interfaces the microprocessor system 50 and peripheral coupling registers 58–60 more particularly a lamp driver register 58, a digital display driver register 59 and a response input register 60 are connected to the microprocessor system 51 via an input-output circuit 57 and coupled to the ports 42, 46, and 44 of the multiplexing circuit through appropriate interfacing means, as presently described.

The game apparatus, as more fully developed hereinafter, basically comprises of a plurality of response means providing input information for selectively driving a plurality of lamp loads and digital display means which may be relatively low level direct current loads as well as main power loads such as the solenoids for chimes, coin counter main game controls and the like.

The interfacing between the microprocessor and the game apparatus in the illustrated embodiment of the present invention includes a suitable decoder 61 to develop the necessary sequential and repetitive activation of the multiplexing input lines 40 and sequentially within a processing cycle, the activation of a second decoder 62 for controlling unit 42 and particularly, the high level power drivers.

More particularly, in the illustrated embodiment of the invention, the central processing unit 51 is connected to the random access memory unit 52 and to the read-only memories in the usual configuration. The output of the random access memory unit 52 is connected to the pair of decoders 61 and 62 shown as one to sixteen decoders. The first decoder 61 includes sixteen outputs connected as the input to the multiplex lines 40 for sequentially and repetitively conditioning of the multiplexing channels 41 for response. The second decoder 62 includes a plurality of outputs connected to the multiplex port 42 to selectively supply power for driving of the heavy AC load such as the chimes, coin acceptor and the like on a continuous, non-multiplexed basis. The two decoders 61 and 62 are strobed by individual command or control signal lines 63 and 64 from the central processing unit 51 which will, of course, transmit appropriate information from the random access memory unit 52 to the appropriate decoder prior to the strobing thereof. In addition, the processing unit 51 includes an interrupt unit 65 which is connected directly to the test port 45 of the multiplex circuit and monitors the corresponding points during each activation of the related multiplexing input lines 40. The computer processing unit 51 in accordance with the usual functioning responds directly to any condition requiring immediate attention such as the tilting of the apparatus, the accepting of coins in order to ensure the appropriate crediting of such input to the apparatus.

Generally, the interfacing to the game elements includes a lamp driver decoder 66 which provides four output lines, one for each of the lamp driving ports 43 of FIG. 3. Lamp drive 66 is coupled to register 58 via an output bus 67 and is strobed from the decoder control line 63. In the illustrated embodiment of the invention, the interfacing is completed by a seven line segment decoder 69 provided for driving of the several digit display units or locations coupled to port 46. The output register 59 provides a four bit signal to the segment decoder 69 having seven output lines 70 to couplers 71 for selectively energizing the appropriate segments of the several units. The couplers 71 are connected to the multiplex lines 40 for sequential enabling and displaying of the particular digit in the several units.

The segment drive register 69 is simultaneously strobed with the lamp drive register 66 from strobe line 63 which strobes the multiplexing line decoder 61 such that the corresponding output lines are activated in synchronism with the activation of the multiplex input lines 40. The devices thus conjointly operate to provide a corresponding circuit path through the input or steering means at the particular intercept point of the multiplex circuit.

More particularly in the embodiment of FIG. 4, the decoders 61 and 62 are shown as one to sixteen decoders with inputs connected to a common output bus 72 of the random access memory 52 and individually strobed by control lines 63 and 64. The multiplexing input line decoder 61 providing sixteen outputs connected respectively to the multiplexing input lines 40 which are individually identified as MUX O through F as shown in FIG. 4.

The one to sixteen decoder 61 for generating the multiplexing input signals to line 40 is connected to the output of the random access memory 52 and provides for the activation of the decoder in an appropriate manner for activating of the MUX drive lines O through F. The actual activation of the MUX line is controlled by the processor sending a strobe signal via line 63 to the decoder 61. The logic unit thus provides for the repetitive activation of the lines during each programmed cycle.

Thereafter, the second decoder 62 receives input from the random access memory 52 in accordance with the response means for selectively activating of load solenoids for the several components connected to the power port 42 on a continuous non-multiplex basis.

The second decoder 62 is coupled to directly drive load elements via the port 42 through outputs activated during the cycle and in practice after the first decoder 61 has completed the scan of the matrix by activation of line O through F. In the illustrated embodiment of the invention, decoder 62 includes eleven output ports or lines 73 for selectively controlling of the several elements coupled to port 42, which as shown in FIG. 4 includes a first "O" or vent portion and thereafter three chime solenoids, left and right bumper and pot solenoids, ball ejection solenoids for the "out" hole and the 3,000 hole as well as the solenoids for the door-knocker, the coin counter, and the coin accepter. Each of the circuits is essentially the same with a couple of circuits shown in FIG. 5 and the circuit described for the ten chime unit 74 which is connected to the one decoder output line 70. The chime unit 74 includes an operating solenoid 75 having one side connected directly to a 50 volt AC bus 76. The other side of the solenoid 75 is returned to ground through a gates switch device, shown as a triac 77. The gate of the triac 77 is connected to the decoder line 1 of lines 73, the "O" line providing a "rest" or off position when no unit is to be energized, of the one to 16 decoders 62. In operation, if a signal has been received, as hereinafter discussed, to activate the ten chime unit 74, the processing unit 51 will have encoded the decoder 62 for establishing a control signal at the appropriate decoder line 73. The control line 64 will simultaneously activate the decoder 62 to energize the number ten chime 74. The triac 77 may, of course, respond on either half of the alternating current signal and will maintain energization until the decoder is latched or reset to "O" or "rest" by the microprocessor. The solenoids for the several other elements with the exception of the coin acceptor are connected via port 42 to the several individual lines 73 and activated in a corresponding manner in accordance with the information provided to the processing unit and thus placed in memory unit 52.

The coin acceptor unit 78 is driven from the eleventh output 73 of the triac drive port 42, and is coupled into the circuit through the lamp driver 66 to insert a memory to positively maintain the acceptor operational during and between each cycle. Thus, the coin acceptor 78 includes a solenoid 79, the one side of which is connected to the fifty volt AC bus 76 with the other side returned to ground through a triac 80. The triac 80 in turn is controlled by the gate signal from the line 73 of the triac driving decoder 62, with the connection coupled to the lamp driver 66 through an opto-isolator unit 81. The gate of the triac 80 is connected to a suitable low voltage source, such as 12 volt source in series with a current dropping resistor 82 and a sensing resistor 83 of the opto-isolator unit 81. The resistance of sensing resistor 83 is normally of such a level as to hold the triac off. A lamp element 84 of the opto-isolator unit 81 has one side connected to line 73 of decoder 62 via port 43 and the opposite side connected in series with a steering diode 85 to the one output of lamp driver 66. If the lamp driver 66 is simultaneously energized with the decoder output, the lamp 84 is illuminated and the resistance of resistor 83 reduced. The gate current will increase and the triac 80 will turn on. The opto-isolator unit 81 will inherently maintain energization as a result of the illuminating characteristic and thus provide for continued operation of the coin acceptor 78.

The lamp driver 66 is shown as including four outputs connected to port 43, and is coupled to the processor input-output unit 57 via register 58 to provide for selective energization of the ports in accordance with the random logic control. The processor will selectively activate the ports 43 in synchronism with the activation of the corresponding MUX lines 40 in accordance with the activation of the response means. Thus as shown in FIG. 4, the lamp driver controls various lamp circuits for indicating various scoring lamps, target lamps, the flipper lights and the like. Each output port 43 is similarly connected and one circuit is schematically shown in detail in FIG. 4.

In the illustrated embodiment, the output of the lamp driver 66 produces a logic signal to a transistorized switch unit 86 shown including a control transistor 87 having its base connected to the lamp drive output line of port 43 and its emitter connected to ground. The collector is connected to control a pair of Darlington connected power transistors 88 having the emitter connected to a suitable power supply, such as a twenty-four volt supply, and the collector connected as the lamp driver "O" input of the output ports 43 to the multiplexing network. The "O" driver is also connected to and is part of port 42 via diode 85 to energize the opto-isolator 81. The lamp driver 66 otherwise controls the several visual display lamps as shown in FIG. 4. For example, when the MUX "O" line 40 is activated, the lamp zero drive line will not be activated, or if activated inoperative, as there is no load connection at such point. When the MUX "1" line 40 is activated, the lamp driver "O" port 43 will be activated if the "A" lamp is to be energized. The processor in turn will determine whether or not the "A" lamp is to be energized in accordance with the input signal indicating whether the "A" target has been activated, as hereinafter described. The several MUX lines O–F each are similarly connected to ground by a transistor 88 which is turned on by the operation of decoder 61. Transistor 88 is shown in a grounded emitter configuration with the collector connected to the MUX lines.

At the MUX "1 " line of input lines 40, the "O" port 43 is connected by a diode 89 in series with the "A" lamp 90 to the MUX "1" line 40. When both the MUX "1" line 40 and the lamp driver "O" line 42 are simultaneously activated, the circuit will be completed and the lamp 90 energized, visually displaying the operative engagement of target "A". In accordance with a unique and particularly practical aspect of the illustrated embodiment of the invention, the lamp 90, and other similar lamps, are low voltage incandescent lamps having a rating significantly below the supply. Thus, where a 24 volt supply is employed, conventional 6 volt incandescent lamps, which are readily available and very inexpensive, are employed. Each lamp is thus driven significantly above the rating and will draw significantly greater current. For example, the current and voltage will both be four fold and the power will increase sixteen fold. However, the lamp is only momentarily energized during each scan cycle and with the sixteen line matrix for a period of 1/16 the cycle time. Thus the average current is reduced to ¼. This duty cycle is readily accepted by the lamps to produce the desired illumination without adversely affecting the practical life thereof. However, the effective reduction in the average current places a significantly smaller load on the connectors and the like and will in fact improve the life of the unit and minimize maintenance and service.

Further, in this system, the transistor 88 is deliberately selected as an inexpensive, relatively low Beta transistor. For example, the power Darlington transistor may have a Beta of 1,000. The transistor 88 then acts as a current limiting element for the lamp 90 during the initial turn-on thereof. Thus, the cold lamp would tend to draw an abnormally high current, which, of course, would adversely affect the connectors and other components as well as the lamp. The low Beta and low cost transistor limits such current. The transistor can readily absorb the voltage which, of course, appears across the emitter to collector, once again because of the very short duration of time.

The system may, therefore, advantageously be constructed with standardized and commercially available parts which can also be readily and conveniently serviced.

The operation of the multiplexing decoder 61 thus moves down the matrix, indicating the corresponding activation for the not "A" lamp, the left extra ball, the zero hundreds, the four hundreds, the eight hundred, the zero thousands, four thousand and eight thousand lamps, as shown in FIG. 4, such units are connected directly to the lamp drive as illustrated.

The "1", "2", and "3" output ports 43 similarly provide for activation of related lamps as identified in FIG. 4 with each of them being connected in circuit in the same manner as that described for the "O" port and as schematically shown in FIG. 5.

In addition, the flipper control switch means 91, coupled to the side mounted buttons 15 of the game apparatus 1, are connected in circuit via the lamp ports 43 and particularly the "2" port. The flipper control switch means 91 are connected in series with the gate circuit of triac switches 90 and to the low voltage power supply by an opto-isolator unit 93. The flipper solenoid 90 is series with the triac 90 to the 50 volt A.C. bus 76. The lamp input of the opto-isolator unit 93 has one side connected to the lamp driver switch 92 of the "2" port 43 and the opposite side connected to the MUX "O" line 40 via a load 95. The flippers 15 are thus continuously enabled as long as the game apparatus is conditioned for play.

The input ports 44, on the other hand, are connected to the input network 68 which as shown in FIG. 4 includes individual passive resistive branches 96 to scale the signal to an appropriate level for input to a computer input register 60. In the illustrated embodiment of the invention, four input lines 44 are illustrated, each of which is connected by a corresponding branch 96 to the computer input register 60. Each input line 44 in turn is connected in common to one side of individual response switches 97 for the various responsive elements and connected in circuit through the several multiplexing input lines 40. Thus, the "O" input port 44 and MUX "O" line 40 are coupled to a left-lane target as shown in FIG. 4, and a left-lane target switch 97 in FIG. 5. If the ball 7 engages the left-lane target 9, it will close the switch 97, thereby completing a circuit through a steering diode 98 between the MUX "O" line 40 and the input register network 68, effecting a grounding and thereby developing a signal at the input line to the register 60. When the MUX "O" line is activated, the signal is transferred to the computing processing unit 51 for storage in the random access 52 and subsequent processing resulting in automatic activation of the appropriate score as the unit sequences through each processing cycle. The several input switches 97 are connected to ground through the same transistors 88 which return the several lamps 90 to ground. As previously described, with the lamp cold, the transistor 88 functions to limit the current until the lamp becomes hot and is turned fully on. This voltage also holds the switch 97 above ground for a corresponding period. This functioning introduces a practical degree of noise immunity into the system such that the switch can be driven from a noisy source. Thus, the transient or noise components generated within the source or the switch will settle out before the switch drops to ground and signals the input register. This again contributes to an inexpensive and reliable interfacing to the programmed logic unit and thus provides for practical implementation of a programmed game apparatus.

The scoring displaying is accomplished through the scanning of the input line 40 and port 46. Each target and the like is preassigned a predetermined score such that each engagement effectively increases the player score by a selected amount. In the illustrated embodiment of the invention, the inclusive MUX "3", "8"; and "A"-"F" lines 40 drive the scoring display lights. The final port 46 is an input-output port which actuates the digital display coupler 71 for indicating each of the player's scores as well as the credit status of the system. The segment driver 69 is encoded via register 59 and activated in synchronism with the decoder 61 to correspondingly set the digit display coupler 71. Each digit is displayed by the well known 7 segment display having 7 individually energized segments with the digits 0–9 selectively presented by energization of one or more of the appropriate segments. Each connector coupler 71 drives an assigned LED display in accordance with the 7 segment input as shown by the coupling cable 99 with the MUX line inputs providing proper selection of the outputs. Thus, the first coupler may be scanned with MUX lines 0–7, the second with lines 4–8, and the final 8–F inclusive. The displays will be related sequentially however, to the scanning with the cross-wiring providing a convenient and inexpensive internal wiring and coupling. The individual interconnecting cables 99 may be suitably tapped to select particular outputs in accordance with the MUX line assignments.

In summary, the game apparatus of this invention may employ conventional, standardized switches, lamps and the like mounted in the usual manner within a pinball housing and uniquely interconnected and interfaced with a programmed logic means to monitor the game and create outputs displays in accordance with the game play. The multiplexing concept and interfacing with the illustrated features and constructions establish significant economy in construction as well as ease and cost of maintenance.

The player enters the coins and operates the game in the identical manner as heretofore, with the game apparatus responding in essentially the same manner with a continuous monitoring of essential functions at port 45 with an immediate and priority response as well as the sequential monitoring of the several inputs via the activation of the scan lines 40 in combination with the sequential monitoring of the input and outputs appearing at ports 43–46 via the programmed logic unit 23. The separate decoder 62 provides for direct driving of the several heavy duty solenoids independently of the multiplex system and, also, where desired, continuous energization such as for example the energization of the bumper solenoids without necessity of the use of memory or storage devices such as opto-isolators. This provides further economy in overall construction without reducing the effectiveness of reliability of the game apparatus.

Various modes of carrying out the invention are contemplated as being within the scope of the following claims, particularly pointing out and distinctly claiming the subject matter which is regarded as the invention.

I claim:

1. A game apparatus comprising:

*a game housing;* a processor having program means for programming the processor and memory means for storing signals;

a physical mass capable of motion;

*a game surface for supporting the surface projectile, said surface being contained in said housing;* player-operated control means *said mass being a surface projectile; operably mounted on said game housing* for affecting the motion of the physical [means] *mass*;

a plurality of response means for detecting the mass, each response means having signaling means associated therewith and operatively connected to the processor for signaling the processor that the response means has detected the mass;

a plurality of display means *connected to said housing* for presenting information based upon the detection of the mass by the response means, each display means having a display activation means associated therewith and operatively connected to the processor for activating the display means in response to a signal from the processor; and multiplexing means operatively connected to the processor for cyclicly and sequentially enabling each of the signaling means to signal the processor that its associated response means has detected the mass, and for cyclicly and sequentially enabling each of the display activation means to activate its associated display means;

said processor having means for storing the signals from the signaling means enabled by the multiplexing means into the memory means, for adddressing the program means and the memory means, and for signaling the display activation means enabled by the multiplexing means, in response to the program means and the memory means, *and wherein said processor, response means and multiplexing means are contained in said housing.*

2. The apparatus of claim 1 wherein the signaling means associated with the respective response means are operatively connected as a plurality of sets of elements in a matrix, the multiplexing means having means for cyclicly and sequentially enabling each set of elements of the matrix.

3. The apparatus of claim 1 wherein the display activation means associated with the respective display means are operatively connected as a plurality of sets of elements in a matrix, the multiplexing means having means for cyclicly and sequentially enabling each set of elements of the matrix.

4. The apparatus of claim 3 further comprising a display drive circuit operatively connected to the processor having a plurality of outputs, each output being connected to a display activation means in each set of elements, for selectively driving the display activation means within the set of elements enabled by the multiplexing means, as determined by a signal from the processor.

5. The apparatus of claim 4 wherein the processor further comprises an input and output circuit means operatively connected to a port of the processor and having a register for temporarily storing signals from the processor representative of the display drive outputs to be activated before transferring the signals to the display drive circuit, and means for transferring said signals to said display drive circuit.

6. The apparatus of claim 3 wherein the multiplexing means for cyclicly and sequentially enabling each set of elements operates at a frequency such that a cyclicly activated display means appears to be continuously active.

7. The apparatus of claim 1 wherein the signaling means associated with the respective response means and the display activation means associated with the respective display means are operatively connected as a plurality of sets of elements in a matrix, the multiplexing means having means for cyclicly and sequentially enabling each set of elements of the matrix.

8. The apparatus of claim 1 wherein said multiplexing means has an enabling rate sufficient to maintain an apparently continuous presentation of information by a plurality of display means simultaneously.

9. The apparatus of claim 8 wherein the display means comprises a lamp having a given voltage rating, and said apparatus comprises means for supplying power to said lamp at a voltage higher than said rating for a duration less than the period of said enabling rate so that the average current to said lamp is less than that required at said given voltage rating.

10. The apparatus of claim 9 wherein the display activation means associated with the respective lamps are operatively connected as a plurality of sets of elements in a matrix, the multiplexing means having means for cyclicly and sequentially enabling each set of elements of the matrix, and wherein the magnitude of said higher voltage is approximately equal to the product of said given voltage rating of the lamp and the square root of the number of sets of display activation elements defined by said plurality of display means.

11. The apparatus of claim 1 wherein the processor further includes synchronizing means for synchronizing the multiplexing means with the processor means for signaling the display activation means enabled by the multiplexing means.

12. The apparatus of claim 11 wherein a display means comprises a lamp, said apparatus comprising a lamp drive circuit and said synchronizing means further comprising means for synchronizing the lamp drive circuit with the multiplexing means and the processor means for signaling the display activation means enabled by the multiplexing means.

13. The apparatus of claim 1 wherein a signaling means of the response means comprises a voltage source and a switch operable by the response means.

14. The apparatus of claim 13 wherein the switch is operatively connected for coupling the voltage source to the multiplexing means, said multiplexing means comprising a decoder for completing the circuit of the voltage source and the switch thereby enabling the response means to signal the processor that the physical mass has been detected.

15. The apparatus of claim 1 wherein the processor further has an input and output circuit means operatively connected to a port of the processor and having a register for storing input signals from the signaling means before transferring the signals to the port of the processor, and means for transferring said signals to said port.

16. The apparatus of claim 1 wherein the [physical mass] *surface projectile* comprises a ball, said [apparatus further comprising] *game surface comprises* a downwardly inclined playing field, and *said apparatus further comprising* means for ejecting the ball to the upper end of the playing field whereby the ball may roll downwardly under the force of gravity across the playing field.

17. The apparatus of claim 1 wherein the plurality of response means include a plurality of bumper means for ejecting the [physical mass] *surface projectile* when detected, each bumper means having solenoid means for actuating the bumper means; said apparatus further comprising a decoding means operatively connected to the processor for selectively energizing the solenoid means as determined by the processor.

18. The apparatus of claim 17 wherein the processor has means for storing signals representing the particular solenoid means to be energized into the memory means, the decoding means comprising a decoder operatively connected to the memory means for decoding the signals from the memory means and having multiple outputs, each output being connected to a solenoid means, and said processor further having means for activating the decoder synchronously with the memory means.

19. The apparatus of claim 18 wherein each of the plurality of solenoid means has a triac switch, the gate of the triac switch being connected to an output of the decoder.

20. The apparatus of claim 17 wherein the plurality of response means further includes audible means for producing sounds when the [physical mass] *surface projectile* is detected, each of the audible means having means operatively connected to the decoding means for activation thereof.

21. The apparatus of claim 20 wherein said audible means comprises a chime and said display activation means includes a solenoid responsive to the decoding means.

22. The apparatus of claim 1 wherein the detection of the [physical mass] *surface projectile* by a response means is assigned a score and the plurality of display means includes multiple digit scoring means for displaying digits representing a player's score.

23. The apparatus of claim 22 wherein the multiple digit scoring means comprises a plurality of single digit display means for displaying a digit of a player's score, each single digit display means being energized one digit at a time.

24. The apparatus of claim 23 wherein the single digit display means comprises a segmented digit display and the display activation means for each segmented digit display comprises a digit drive circuit having a plurality of inputs and outputs corresponding to the segments of the digits.

25. The apparatus of claim 24 further comprising a segment drive circuit operatively connected to the processor for driving the inputs as determined by the processor of each of the digit drives when the digit drive is enabled by the multiplexing means.

26. The apparatus of claim 25 wherein the processor further comprises an input and output circuit means operatively connected to the processor and having a register for temporarily storing the signals from the processor representative of the digit to be displayed before transferring the signals to the segment drive circuit, and means to transfer said signals to said segment drive circuit.

27. The apparatus of claim 1 wherein the display activation means associated with a display means comprises a power source and a transistor switch means for operatively coupling the power source and the display means in response to the signal from the processor; the multiplexing means comprising a decoder for completing the circuit of the power source, transistor switch means and the display means.

28. The apparatus of claim 27 wherein the transistor switch means comprises a control transistor coupled to a pair of Darlington-connected power transistors.

29. The apparatus of claim 27 wherein the display means comprises a lamp and the transistor switch means comprises a transistor having a sufficiently low Beta characteristic so that it acts as a current limiter during initial turn-on of the lamp.

30. The apparatus of claim 1 wherein the player-operated control means includes a player operable switch operatively connected in circuit relation with a solenoid [for] *having a lamp associated therewith and operably connected to the processor for activating the optical coupling means in response to a signal from the processor, the optical coupling means* activating the solenoid, and lamp operated optical coupling means for enabling the player operable switch in response to the multiplexing means and the processor, the multiplexing rate being sufficient to maintain continuous enabling of the player operable switch during a multiplexing cycle.

31. The apparatus of claim 30 wherein the player-operated control means includes a flipper actuated by said solenoid in response to the player operable switch at any time during said multiplexing cycle.

32. The apparatus of claim 31 wherein said player-operated control means further includes a thyristor circuit, the thyristor having gate and load terminals, the gate being connected to the player operable switch and the load terminals being coupled to the solenoid, so that the thyristor is triggered by the player operable switch and in turn causes the solenoid to be energized.

33. The apparatus of claim 1 wherein the processor further includes an interrupt input port, said apparatus further comprising monitoring means for determining the status of a condition of the apparatus and having signaling means operatively connected to the interrupt port of the processor for signaling the processor with respect to the condition.

34. The apparatus of claim 33 wherein said apparatus comprises a plurality of monitoring means for a plurality of conditions of the apparatus, each having a signaling means operatively connected to said interrupt port, and said multiplexing means having means for sequentially enabling each of said signaling means of the plurality of monitoring means.

35. The apparatus of claim 34 wherein said signaling means associated with the respective monitoring means, the signaling means associated with the respective response means, and the display activation means associated with the respective display means are operatively connected as a plurality of sets of elements in a matrix, the multiplexing means having means for cyclicly and sequentially enabling each set of elements of the matrix.

36. The apparatus of claim 35 wherein the interrupt input port of the processor accepts only one bit, the apparatus having no more than one signaling means associated with the monitoring means in each set of elements in the matrix.

37. The apparatus of claim 34 wherein said plurality of conditions includes at least one of the group consisting of a tilt condition, proper receipt of coins condition and a credit condition.

38. The apparatus of claim 33 wherein said condition includes a tilt condition.

39. The apparatus of claim 33 wherein the processor further includes interrupt means responsive to the signaling means supplied to the interrupt port for providing immediate processing of a condition determined by the monitoring means.

40. A pinball game apparatus comprising:

a computer including a central processing unit operatively connected to a read-only memory, a random-access memory for storing data, and an input and output circuit for inputting the data into and outputting the data from the random-access memory and the central processing unit;

a ball;

a downwardly inclined playing field;

means for ejecting the ball on to the playing field whereby the ball may roll downwardly under the force of gravity;

a plurality of bumpers carried by the playing field having solenoids for actuating the bumpers, each solenoid having a switching device for activating the solenoid, and each bumper having signaling means operatively connected to the input and output circuit for sending data indicating that a bumper was struck by the ball;

a first decoder operatively connected to the input and output circuit and being responsive to the bumper data for providing a signal to the switching device associated with the bumper to be actuated;

a plurality of lamps, each lamp being connected in a circuit having a power source and switching means for connecting the lamp to the power source;

said signaling means associated with the respective bumpers and the switching means associated with the respective lamps being operatively connected as a plurality of sets of elements in a matrix;

a lamp drive operatively connected to the input and output circuit having a plurality of outputs, each output being connected to a switching means associated with a lamp in each of the sets of elements for driving the switching means of each set as determined by data from the input and output circuit; and a second decoder operatively connected to the central processing unit for cyclicly and sequentially enabling each set of elements of the matrix;

said central processing unit having means for synchronizing the first decoder, second decoder, and the lamp drive with the input and output circuit.

41. The apparatus of claim 40 comprising a plurality of digital displays for representing a score of a player, each digital display having a digit drive circuit associated therewith and operatively connected to the input and output circuit for driving the digital display as determined by data from the input and output circuit.

42. The apparatus of claim 41 wherein the input and output circuit provides data corresponding to one digit at a time, said elements of the matrix further comprising the plurality of digit drive circuits with no more than one digit drive circuit associated with the digital displays in each set of elements in the matrix.

43. The apparatus of claim 40 wherein said second decoder has an enabling rate sufficient to maintain apparently continuous illumination of each lamp.

44. The apparatus of claim 43 wherein the lamp has a given voltage rating, and the apparatus comprises means for supplying power to the lamp at a voltage higher than said rating for a duration less than the period of said enabling rate.

45. A pinball game comprising a processor having programming means and memory means; a ball; a downwardly inclined playing field; player operated means for ejecting the ball on to the playing field whereby the ball may roll downwardly; a plurality of response means for detecting the ball and having signaling means associated therewith and operatively connected to the processor for signaling the processor that the response means has detected the ball; a plurality of display means for presenting information based upon the detection of the ball by the response means and having display activation means associated therewith and operatively connected to the processor for activating the display means in response to a signal from the processor; and multiplexing means operatively connected to the processor for cyclicly and sequentially enabling the signaling means to signal the processor that its associated response means has detected the ball, and for cyclicly and sequentially enabling the display activation means to activate its associated display means; said processor having means for storing the signals from the signaling means enabled by the multiplexing means in the memory means, for addressing the program means and the memory means, and for signaling the display activation means enabled by the multiplexing means, in response to the program means and the memory means.

46. The game of claim 45 wherein the signaling means associated with the respective response means and the display activation means associated with the respective display means are operatively connected as a plurality of sets of elements in a matrix, the multiplexing means having means for cyclicly and sequentially enabling each set of elements of the matrix.

47. The game of claim 45 wherein said multiplexing means has an enabling rate sufficient to maintain an apparently continuous presentation of information by a plurality of display means simultaneously.

48. The game of claim 47 wherein the display means comprises a lamp having a given voltage rating, and said game comprising means for supplying power to said lamp at a voltage higher than said rating for a duration less than the period of said enabling rate.

49. The apparatus of claim 48 further comprising a matrix of sets of elements and wherein the display activation means associated with the respective lamps are operatively connected as a plurality of sets of elements within the matrix, the multiplexing means having means for cyclicly and sequentially enabling each set of elements of the matrix, and wherein the magnitude of said higher voltage is approximately equal to the product of said given voltage rating of the lamp and the square root of the number of sets of elements in the matrix.

50. The game of claim 45 wherein a response means comprises a bumper which may be actuated when struck by the ball, and its associated signaling means comprises a voltage source and a switch operable by the bumper, said switch being operatively connected for coupling the voltage source to said multiplexing means, and said multiplexing means comprising a decoder for completing the circuit of the voltage source and the switch to thereby enable the bumper to signal the processor that the ball has made contact therewith.

51. The game of claim 50 comprising solenoid means for actuating the bumper, the game further comprising decoding means operatively connected to the processor for selectively energizing the solenoid means as determined by the processor to thereby drive the ball away from the bumper, the speed of the processor and decoders being sufficient to respond to provide said driving action by the bumper while it is still in contact with the bumper.

52. A pinball game comprising a digital processor having programming means for programming the processor, and memory means for storing signals; a ball; a downwardly inclined playing field; player operated means for ejecting the ball onto the playing field whereby the ball may roll downwardly; a plurality of response means for detecting the ball and having signaling means associated therewith and operatively connected to the processor for signaling the processor that the response means has detected the ball; and a plurality of display means for presenting information based upon the detection of the ball by the response means and having display activation means associated therewith and operatively connected to the processor for activating the display means in response to a signal from the processor; said processor having means for transferring the signals from the signaling means to the memory means, for addressing the program means and the memory means, and for signaling the display activation means in response to the program means and memory means; and the display activation means associated with the respective display means and signaling means associated with the respective response means defining a plurality of operable elements, the game further comprising multiplexing means for cyclically enabling at least some of said elements to perform their associated functions.

53. The game of claim 52 wherein said elements comprise said signaling means.

54. The game of claim 52 wherein said elements comprise said display activation means.

55. The game of claim 52 wherein said elements comprise said signaling means and said display activation means.

*56. A game apparatus comprising:*

*a processor having program means for programming the processor and memory means for storing signals;*

*a physical mass capable of motion, said mass being a surface projectile;*

*a game surface for supporting the surface projectile;*

*player-operated control means for affecting the motion of the physical mass;*

*a plurality of response means for detecting the mass, each response means having signaling means associated therewith and operatively connected to the processor for signaling the processor that the response means has detected the mass;*

*a plurality of display means for presenting information based upon the detection of the mass by the response means, each display means having a display activation means associated therewith and operatively connected to the processor for activating the display means in response to a signal from the processor; and*

*multiplexing means operatively connected to the processor for cyclicly and sequentially enabling each of the signaling means to signal the processor that its associated response means has detected the mass, and for cyclicly and sequentially enabling each of the display activation means to activate its associated display means;*

*said processor having means for storing the signals from the signaling means enabled by the multiplexing means into the memory means, for addressing the program means and the memory means, and for signaling the display activation means enabled by the multiplexing means, in response to the program means and the memory means;*

*said multiplexing means having an enabling rate sufficient to maintain an apparently continuous presentation of information by a plurality of display means simultaneously, the display means comprising a lamp having a given voltage rating, and said apparatus further comprising means for supplying power to said lamp at a voltage higher than said rating for a duration less than the period of said enabling rate so that the average current to said lamp is less than that required at said given voltage rating,*

*the display activation means associated with the respective lamps being operatively connected as a plurality of sets of elements in a matrix, the multiplexing means having means for cyclicly and sequentially enabling each set of elements of the matrix, and the magnitude of said higher voltage being approximately equal to the product of said given voltage rating of the lamp and the square root of the number of sets of display activation elements defined by said plurality of display means.*

*57. A game apparatus comprising:*

*a processor having program means for programming the processor and memory means for storing signals;*

*a physical mass capable of motion, said mass being a surface projectile;*

*a game surface for supporting the surface projectile;*

*player-operated control means for affecting the motion of the physical mass;*

*a plurality of response means for detecting the mass, each response means having signaling means associated therewith and operatively connected to the processor for signaling the processor that the response means has detected the mass;*

*a plurality of display means for presenting information based upon the detection of the mass by the response means, each display means having a display activation means associated therewith and operatively connected to the processor for activating the display means in response to a signal from the processor; and*

*multiplexing means operatively connected to the processor for cyclicly and sequentially enabling each of the signaling means to signal the processor that its associated response means has detected the mass, and for cyclicly and sequentially enabling each of the display activation means to activate its associated display means;*

*said processor having means for storing the signals from the signaling means enabled by the multiplexing means into the memory means, for addressing the program means and the memory means, and for signaling the display activation means enabled by the multiplexing means, in response to the program means and the memory means;*

*the display activation means associated with a display means comprising a power source and a transistor switch means for operatively coupling the power source and the display means in response to the signal from the processor;*

*the multiplexing means comprising a decoder for completing the circuit of the power source, transistor switch means and the display means; and*

*the transistor switch means comprising a control transistor coupled to a pair of Darlington-connected power transistors.*

*58. A game apparatus comprising:*

*a processor having program means for programming the processor and memory means for storing signals;*

*a physical mass capable of motion, said mass being a surface projectile;*

*a game surface for supporting the surface projectile;*

*player-operated control means for affecting the motion of the physical mass;*

*a plurality of response means for detecting the mass, each response means having signaling means associated therewith and operatively connected to the processor for signaling the processor that the response means has detected the mass;*

*a plurality of display means for presenting information based upon the detection of the mass by the response means, each display means having a display activation means associated therewith and operatively connected to the processor for activating the display means in response to a signal from the processor; and*

*multiplexing means operatively connected to the processor for cyclicly and sequentially enabling each of the signaling means to signal the processor that its associated response means has detected the mass, and for cyclicly and sequentially enabling each of the display activation means to activate its associated display means;*

*said processor having means for storing the signals from the signaling means enabled by the multiplexing means into the memory means, for addressing the program means and the memory means, and for signaling the display activation means enabled by the multiplexing means, in response to the program means and the memory means;*

*the player-operated control means including a player operable switch operatively connected in circuit relation with a solenoid for activating the solenoid, and lamp operated optical coupling means having a lamp associated therewith and operably connected to the processor for activating the optical coupling means in response to a signal from the processor, the optical coupling means enabling the player operable switch in response to the multiplexing means and the processor, the multiplexing rate being sufficient to maintain continuous enabling of the player operable switch during a multiplexing cycle.*

*59. The apparatus of claim 58 wherein the player-*operated control means includes a flipper actuated by said solenoid in response to the player operable switch at any time during said multiplexing cycle.

*60. The apparatus of claim 59 wherein said player-operated control means further includes a thyristor circuit, the thyristor having gate and load terminals, the gate being connected to the player operable switch and the load terminals being coupled to the solenoid, so that the thyristor is triggered by the player operable switch and in turn causes the solenoid to be energized.*

*61. A game apparatus comprising:*

*a processor having program means for programming the processor and memory means for storing signals;*

*a physical mass capable of motion, said mass being a surface projectile;*

*a game surface for supporting the surface projectile;*

*player-operated control means for affecting the motion of the physical mass;*

*a plurality of response means for detecting the mass, each response means having signaling means associated therewith and operatively connected to the processor for signaling the processor that the response means has detected the mass;*

*a plurality of display means for presenting information based upon the detection of the mass by the response means, each display means having a display activation means associated therewith and operatively connected to the processor for activating the display means in response to a signal from the processor; and*

*multiplexing means operatively connected to the processor for cyclicly and sequentially enabling each of the signaling means to signal the processor that its associated response means has detected the mass, and for cyclicly and sequentially enabling each of the display activation means to activate its associated display means;*

*said processor having means for storing the signals from the signaling means enabled by the multiplexing means into the memory means, for addressing the program means and the memory means, and for signaling the display activation means enabled by the multiplexing means, in response to the program means and the memory means.*

*62. The apparatus of claim 61 wherein the signaling means associated with the respective response means are operatively connected as a plurality of sets of elements in a matrix, the multiplexing means having means for cyclicly and sequentially enabling each set of elements of the matrix.*

*63. The apparatus of claim 61 wherein the display activation means associated with the respective display means are operatively connected as a plurality of sets of elements in a matrix, the multiplexing means having means for cyclicly and sequentially enabling each set of elements of the matrix.*

*64. The apparatus of claim 61 further comprising a display drive circuit operatively connected to the processor having a plurality of outputs, each output being connected to a display activation means in each set of elements, for selectively driving the display activation means within the set of elements enabled by the multiplexing means, as determined by a signal from the processor.*

*65. The apparatus of claim 64 wherein the processor further comprises an input and output circuit means operatively connected to a port of the processor and having a register for temporarily storing signals from the processor representative of the display drive outputs to be activated before transferring the signals to the display drive circuit, and means for transferring said signals to said display drive circuit.*

*66. The apparatus of claim 63 wherein the multiplexing means for cyclicly and sequentially enabling each set of elements operates at a frequency such that a cyclicly activated display means appears to be continuously active.*

*67. The apparatus of claim 61 wherein the signaling means associated with the respective response means and the display activation means associated with the respective display means are operatively connected as a plurality of sets of elements in a matrix, the multiplexing means having means for cyclicly and sequentially enabling each set of elements of the matrix.*

*68. The apparatus of claim 61 wherein said multiplexing means has an enabling rate sufficient to maintain an apparently continuous presentation of information by a plurality of display means simultaneously.*

*69. The apparatus of claim 68 wherein the display means comprises a lamp having a given voltage rating and said apparatus comprises means for supplying power to said lamp at a voltage higher than said rating for a duration less than the period of said enabling rate so that the average current to said lamp is less than that required at said given voltage rating.*

*70. The apparatus of claim 61 wherein the processor further includes synchronizing means for synchronizing the multiplexing means with the processor means for signaling*

*the display activation means enabled by the multiplexing means.*

*71. The apparatus of claim 70 wherein a display means comprises a lamp, said apparatus comprising a lamp drive circuit and said synchronizing means further comprising means for synchronizing the lamp drive circuit with the multiplexing means and the processor means for signaling the display activation means enabled by the multiplexing means.*

*72. The apparatus of claim 61 wherein a signaling means of the response means comprises a voltage source and a switch operable by the response means.*

*73. The apparatus of claim 72 wherein the switch is operatively connected for coupling the voltage source to the multiplexing means, said multiplexing means comprising a decoder for completing the circuit of the voltage source and the switch thereby enabling the response means to signal the processor that the physical mass has been detected.*

*74. The apparatus of claim 61 wherein the processor further has an input and output circuit means operatively connected to a port of the processor and having a register for storing input signals from the signaling means before transferring the signals to the port of the processor, and means for transferring said signals to said port.*

*75. The apparatus of claim 61 wherein the surface projectile comprises a ball, said game surface comprises a downwardly inclined playing field, and said apparatus further comprises means for ejecting the ball to the upper end of the playing field whereby the ball may roll downwardly under the force of gravity across the playing field.*

*76. The apparatus of claim 61 wherein the plurality of response means includes a plurality of bumper means for ejecting the surface projectile when detected, each bumper means having solenoid means for actuating the bumper means; said apparatus further comprising a decoding means operatively connected to the processor for selectively energizing the solenoid means as determined by the processor.*

*77. The apparatus of claim 76 wherein the processor has means for storing signals representing the particular solenoid means to be energized into the memory means, the decoding means comprising a decoder operatively connected to the memory means for decoding the signals from the memory means and having multiple outputs, each output being connected to a solenoid means, and said processor further having means for activating the decoder synchronously with the memory means.*

*78. The apparatus of claim 77 wherein each of the plurality of solenoid means has a triac switch, the gate of the triac switch being connected to an output of the decoder.*

*79. The apparatus of claim 76 wherein the plurality of response means further includes audible means for producing sounds when the surface projectile is detected, each of the audible means having means operatively connected to the decoding means for activation thereof.*

*80. The apparatus of claim 79 wherein said audible means comprises a chime and said display activation means includes a solenoid responsive to the decoding means.*

*81. The apparatus of claim 61 wherein the detection of the surface projectile by a response means is assigned a score and the plurality of display means includes multiple digit scoring means for displaying digits representing a player's score.*

*82. The apparatus of claim 81 wherein the multiple digit scoring means comprises a plurality of single digit display means for displaying a digit of a player's score, each single digit display means being energized one digit at a time.*

*83. The apparatus of claim 82 wherein the single digit display means comprises a segmented digit display and the display activation means for each segmented digit display comprises a digit drive circuit having a plurality of inputs and outputs corresponding to the segments of the digits.*

*84. The apparatus of claim 83 further comprising a segment drive circuit operatively connected to the processor for driving the inputs as determined by the processor of each of the digit drives when the digit drive is enabled by the multiplexing means.*

*85. The apparatus of claim 84 wherein the processor further comprises an input and output circuit means operatively connected to the processor and having a register for temporarily storing the signals from the processor representative of the digit to be displayed before transferring the signals to the segment drive circuit, and means to transfer said signals to said segment drive circuit.*

*86. The apparatus of claim 61 wherein the display activation means associated with a display means comprises a power source and a transistor switch means for operatively coupling the power source and the display means in response to the signal from the processor; the multiplexing means comprising a decoder for completing the circuit of the power source, transistor switch means and the display means.*

*87. The apparatus of claim 86 wherein the display means comprises a lamp and the transistor switch means comprises a transistor having a sufficiently low Beta characteristic so that it acts as a current limiter during initial turn-on of the lamp.*

*88. The apparatus of claim 61 wherein the processor further includes an interrupt input port, said apparatus further comprising monitoring means for determining the status of a condition of the apparatus and having signaling means operatively connected to the interrupt port of the processor for signaling the processor with respect to the condition.*

*89. The apparatus of claim 88 wherein said apparatus comprises a plurality of monitoring means for a plurality of conditions of the apparatus, each having a signaling means operatively connected to said interrupt port, and said multiplexing means having means for sequentially enabling each of said signaling means of the plurality of monitoring means.*

*90. The apparatus of claim 89 wherein said signaling means associated with the respective monitoring means, the signaling means associated with the respective response means, and the display activation means associated with the respective display means are operatively connected as a plurality of sets of elements in a matrix, the multiplexing means having means for cyclicly and sequentially enabling each set of elements of the matrix.*

*91. The apparatus of claim 90 wherein the interrupt input port of the processor accepts only one bit, the apparatus having no more than one signaling means associated with the monitoring means in each set of elements in the matrix.*

*92. The apparatus of claim 89 wherein said plurality of conditions includes at least one of the group consisting of a tilt condition, proper receipt of coins condition and a credit condition.*

*93. The apparatus of claim 88 wherein said condition includes a tilt condition.*

*94. The apparatus of claim 88 wherein the processor further includes interrupt means responsive to the signaling means supplied to the interrupt port for providing immediate processing of a condition determined by the monitoring means.*

*95. A game apparatus comprising:*

*a processor having program means for programming the processor and memory means for storing signals*

*a physical mass capable of motion;*

*player-operated control means for affecting the motion of the physical means;*

*a plurality of response means for detecting the mass, each response means having signaling means associated therewith and operatively connected to the processor for signaling the processor that the response means has detected the mass;*

*a plurality of display means for presenting information based upon the detection of the mass by the response means, each display means having a display activation means associated therewith and operatively connected to the processor for activating the display means in response to a signal from the processor; and*

*multiplexing means operatively connected to the processor for cyclicly and sequentially enabling each of the signaling means to signal the processor that its associated response means has detected the mass, and for cyclicly and sequentially enabling each of the display activation means to activate its associated display means;*

*said processor having means for storing the signals from the signaling means enabled by the multiplexing means into the memory means, for addressing the program means and the memory means, and for signaling the display activation means enabled by the multiplexing means, in response to the program means and the memory means; and*

*the physical mass comprising a ball, said apparatus further comprising a downwardly inclined playing field, and means for ejecting the ball to the upper end of the playing field whereby the ball may roll downwardly under the force of gravity across the playing field.*

* * * * *